US 6,587,224 B1

(12) United States Patent
Nabeshima et al.

(10) Patent No.: US 6,587,224 B1
(45) Date of Patent: Jul. 1, 2003

(54) IMAGE READING APPARATUS THAT CAN CORRECT CHROMATIC ABERRATION CAUSED BY OPTICAL SYSTEM AND CHROMATIC ABERRATION CORRECTION METHOD

(75) Inventors: Takayuki Nabeshima, Toyokawa (JP); Makoto Kumagai, Toyokawa (JP); Satoshi Iwasaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/395,563

(22) Filed: Sep. 14, 1999

(30) Foreign Application Priority Data

Sep. 14, 1998 (JP) .............................. 10-259780

(51) Int. Cl.[7] .......................... G06K 15/00; H04N 1/04; H04N 1/46
(52) U.S. Cl. .......................... 358/1.9; 358/475; 358/509
(58) Field of Search .................. 358/1.9, 506, 507, 358/505, 509, 514, 515, 475, 520; 382/312, 274

(56) References Cited

U.S. PATENT DOCUMENTS

| 4,731,661 A | * | 3/1988 | Nagano | ...................... 358/75 |
| 4,943,155 A | * | 7/1990 | Cross | ........................ 353/33 |
| 5,168,373 A | * | 12/1992 | Nakamura | ................... 358/406 |
| 5,691,827 A | * | 11/1997 | Kamei | ........................ 358/530 |
| 6,205,244 B1 | * | 3/2001 | Bawolek | ..................... 382/162 |
| 6,320,668 B1 | * | 11/2001 | Kim | ........................... 358/1.1 |
| 6,421,146 B1 | * | 7/2002 | Yoo | .......................... 358/461 |

FOREIGN PATENT DOCUMENTS

| JP | 04-280574 | * | 6/1992 | ............. H04N/1/40 |
| JP | 05-122542 | | 5/1993 | ............. H04N/1/46 |

* cited by examiner

*Primary Examiner*—Jerome Grant, II
(74) *Attorney, Agent, or Firm*—Burns, Doane, Swecker & Mathis, LLP (57) ABSTRACT

In order to correct chromatic aberration accurately and read out a document original properly, an image reader apparatus includes a chromatic aberration correction chart, a CCD linear sensor, and a correction processing unit. A chromatic aberration correction chart includes a high reflectance portion and a low reflectance portion lower than the high reflectance portion. A CCD linear sensor receives light reflected from the chromatic aberration correction chart. A correction processing unit corrects chromatic aberration of image data according to a light receiving position in the photoelectric conversion unit receiving light of a first wavelength included in the reflected light from the chromatic aberration correction chart and a light receiving position in the photoelectric conversion unit receiving light of a second wavelength included in the reflected light from the chromatic aberration correction chart.

16 Claims, 10 Drawing Sheets

MAIN SCANNING DIRECTION

IMAGE READING APPARATUS THAT CAN CORRECT CHROMATIC ABERRATION CAUSED BY OPTICAL SYSTEM AND CHROMATIC ABERRATION CORRECTION METHOD

This application is based on Japanese Application No. 10-259780 filed in Japan, the contents of which are hereby incorporated by reference.

BACKGROUND OF THE INVENTION

1. Field of the Invention

The present invention relates to an image reading apparatus that carries out image reading such as a color copy machine, a facsimile apparatus, a multiple function apparatus thereof, and a microfilm reader, and a chromatic aberration correction method applicable to such apparatuses. More particularly, the present invention relates to an image reading apparatus that corrects chromatic aberration caused by an optical system, and a method of correcting chromatic aberration that is applicable to such an image reader.

2. Description of the Related Art

Conventionally, an image reading apparatus that receives light directed to and reflected from a document original by a solid state image sensing device such as a CCD linear sensor through a lens to provide image data is known. In such an image reading apparatus, the light of the wavelength of red, (abbreviated as "R" hereinafter), green (abbreviated as "G" hereinafter) and blue (abbreviated as "B" hereinafter) are respectively received by a CCD linear sensor. Image data is output according to the received amount of light. However, the position where an image is formed on the CCD linear sensor by respective light of R, G, and B will differ from that of the other images due to the different index of refraction of each R, G, and B light to appear as chromatic aberration. When an image of a pattern with black vertical stripes on a white background is read, the position of the light of R, G, and B forming an image on the CCD linear sensor is deviated. As a result, color blur and the like is generated at the edge of the vertical stripe pattern.

To compensate for this effect of chromatic aberration, the conventional image reading apparatus corrected the output of the CCD linear sensor. For this correction, the R, G, and B outputs of a pixel of target and neighborhood pixels are read out. The outputs of the neighboring pixels of the target pixel are multiplied by a predetermined correction coefficient. The value that has small difference from that of the target pixel is taken as the value for the target pixel. This correction will be described in further detail.

Figure 13:
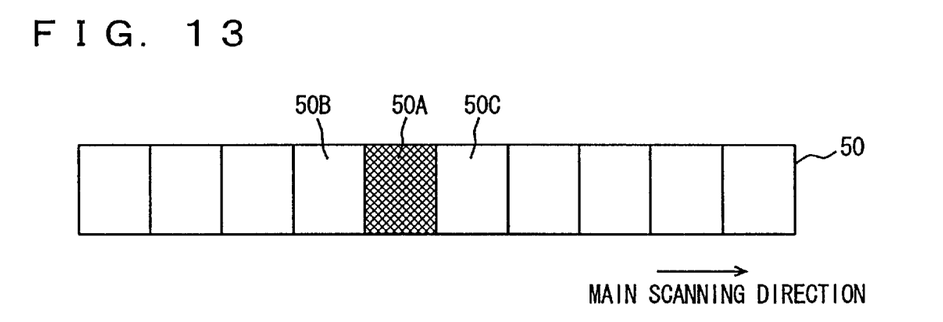
FIG. 13 shows the pixel arrangement of a CCD linear array.

Referring to FIG. 13, a CCD linear sensor 50 has a plurality of pixels arranged in the main scanning direction. The conventional chromatic aberration correction method is carried out according to the output of this CCD linear sensor. Here, the R, G, and B outputs of a target pixel 50A are R0, G0 and B0, and of a pixel 50B adjacent to target pixel 50A are R1, G1 and B1. The R, G, and B outputs of a pixel 50C adjacent to target pixel 50A are R2, G2 and B2. The correction amount of target pixel 50A is compared with a value which is the R, G, and B outputs of adjacent pixels 50B and 50C multiplied by a predetermined coefficient, and then corrected to a value of small color difference (R, G, and B output difference).

As specific examples of calculation, "$R=R1 \times N + R0 \times M$", "$B=B1 \times N + B0 \times M$", "$R=R2 \times N + R0 \times M$", and "$B=B2 \times N + B0 \times M$" are calculated for the G output G0 of target pixel 50A. M and N are constants determined by the property of the lens with the relationship of $N+M=1$. Respective combinations of the calculated R and B are compared with G0. The combination of R and B that has the smallest RGB difference is selected. The selected R and B are set as the corrected R output and B output of the target pixel.

The chromatic aberration correction of the conventional image reading apparatus is simply implemented by carrying out correction by image processing using only the information of the read out image data. No consideration was made whether the chromatic aberration was caused by the optical system or caused by color deviation of the document itself. Furthermore, there was no correction based upon detection of the chromatic aberration of the optical system.

SUMMARY OF THE INVENTION

In view of the foregoing, an object of the present invention is to provide an image reading apparatus that can properly read out a document image by detecting and correcting chromatic aberration caused by the optical system, and a chromatic aberration correction method.

According to an aspect of the present invention, an image reading apparatus includes a chromatic aberration correction chart with a high reflectance portion and a low reflectance portion, lower in reflectance than that of the high reflectance portion, a photoelectric conversion unit to receive light reflected from the chromatic aberration correction chart, and a correction processing unit correcting the chromatic aberration of image data according to a light receiving position in the photoelectric conversion unit receiving light of a first wavelength included in the reflected light from the chromatic aberration correction chart and a light receiving position in the photoelectric conversion unit receiving light of a second wavelength included in the reflected light from the chromatic aberration correction chart.

According to another aspect of the present invention, a chromatic aberration correction method of an image reading apparatus includes the steps of receiving light reflected from a chromatic aberration correction chart having a high reflectance portion and a low reflectance portion lower in reflectance than that of the high reflectance portion, detecting a first light receiving position in the photoelectric conversion unit receiving light of a first wavelength included in the light reflected from the high reflectance portion and a second light receiving position in the photoelectric conversion unit receiving light of a second wavelength included in the light reflected from the high reflectance portion, and correcting chromatic aberration of image data according to the first and second light receiving positions.

According to a further aspect of the present invention, a reading apparatus includes a light source, a correction chart having a portion formed in different density, an optical system focusing light from the light source reflected at the correction chart, a light receiving unit receiving light focused by the optical system, separated into light of predetermined wavelengths, and a processor correcting chromatic aberration caused by the optical system according to data of each separated light obtained by the light receiving unit.

According to the present invention, an image reading apparatus that can correct chromatic aberration accurately and that can read out a document original properly, and a chromatic aberration correction method are provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

An image reading apparatus according to the first embodiment of the present invention will be described hereinafter. In the drawings, the same reference characters denote the same or corresponding components.

Figure 1:
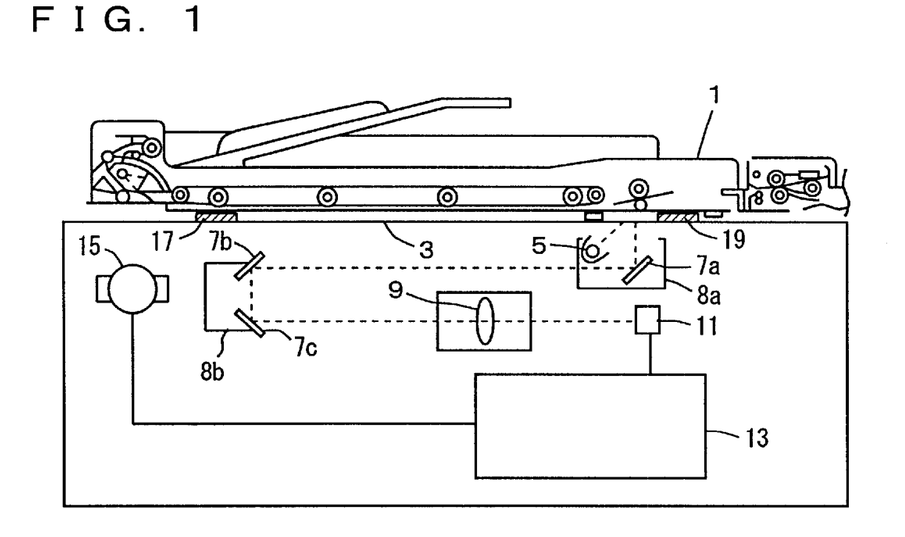
FIG. 1 is a sectional view of an image reading apparatus showing the entire structure according to an embodiment of the present invention.

Referring to FIG. 1, an image reading apparatus includes an automatic document feeder 1 (referred to as "ADF 1" hereinafter), a platen 3, a lamp 5, mirrors 7a–7c, a lens 9, a CCD linear sensor 11, a data processing unit 13, an edge pattern 17, a shading correction plate 19, and a drive motor 15.

ADF 1 feeds the plurality of documents placed thereon one by one sequentially to platen 3. The document placed on platen 3 is illuminated by lamp 5. The light reflected from the document is guided to lens 9 by mirrors 7a–7c. Lens 9 forms an image by the light reflected from the document at CCD linear sensor 11. CCD linear sensor 11 converts the received light into an image signal, which is provided to data processing unit 13.

CCD linear sensor 11 has the light receiving elements arranged in the main scanning direction (the direction perpendicular to the drawing sheet) to read the original one line at a time. RGB filters are provided above CCD linear sensor 11. CCD linear sensor 11 can read out a color image according to the three output values of R, G, and B. Lamp 5 and mirror 7a are supported by a slider 8a. Slider 8a moves in the sub scanning direction (horizontal direction in the drawing sheet) by drive motor 15. By the movement of slider 8 in the sub scanning direction, CCD linear sensor 11 can sequentially read out the subsequent lines from the document.

Slider 8a and slider 8b are driven by drive motor 15 to move while maintaining the conjugate length of lens 9.

Data processing unit 13 carries out the shading process, the chromatic aberration correction process, and predetermined image processing according to the image signal sent from CCD linear sensor 11.

Chromatic aberration correction chart 17 and shading correction plate 19 are placed on platen 3 at respective positions avoiding the region where the original is to be placed. Chromatic aberration correction chart 17 and shading correction plate 19 have a length identical to the length in the main scanning direction of the region where the document is to be placed. Chromatic aberration correction chart 17 is scanned when the chromatic aberration correction coefficient used in the chromatic aberration correction process that will be described afterwards is to be determined. Shading correction plate 19 is a plate white in color. Shading correction plate 19 is scanned for the determination of the correction coefficient used in the shading process carried out by a shading circuit that will be described afterwards.

The place where the chromatic aberration correction chart and the shading correction plate is mounted is not limited to the position above the platen. They can be mounted at an arbitrary position within the readable range of the image reading apparatus.

Although a CCD linear sensor 11 of one dimension is used as the photoelectric conversion unit that receives light reflected from the document, a two-dimensional solid state imaging device can be used instead. The arrangement of mirrors 7a–7c, lens 9 and CCD linear sensor 11 is not limited to that described above. An arbitrary arrangement that allows the light reflected from the document to be received at CCD linear sensor 11 can be employed.

Figure 2:
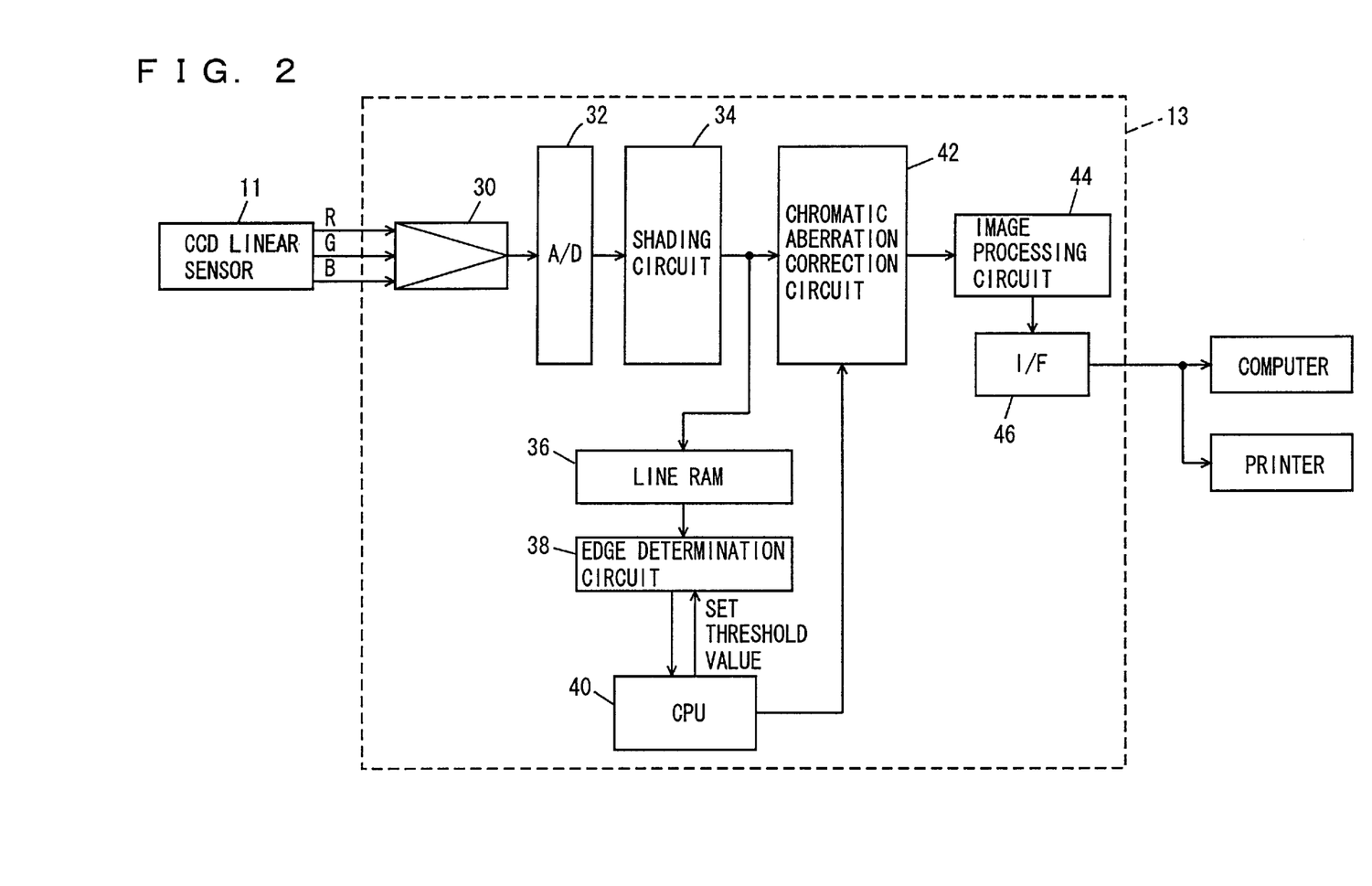
FIG. 2 is a block diagram showing a schematic structure of a data processing unit of the image reading apparatus.

Referring to FIG. 2, the signal from CCD linear sensor 11 is amplified to a predetermined output level by a gain control amplifier (GCA) 30, and then converted into digital data by an A/D converter 32. The image signal converted into digital data is subjected to shading correction by shading circuit 34. The shading correction compensates for the uniformity of the density when a document of uniform density is read. More specifically, the unevenness caused by variation in the distributed light from lamp 5 and variation in the pixel sensitivity of CCD linear sensor 11 is corrected. Light is directed from lamp 5 to the white shading correction plate 19. The light reflected therefrom is received by CCD linear sensor 11. The correction coefficient used in the shading correction process is obtained according to the output of CCD linear sensor 11. Using the obtained correction coefficient, the digital image data is subjected to a shading correction process. The shading correction can be carried out by wellknown measures.

The shading-corrected image signal is applied to a line RAM 36 and to a chromatic aberration correction circuit 42. Chromatic aberration correction circuit 42 corrects the chromatic aberration of the image signal from shading circuit 34 according to the chromatic aberration correction coefficient from CPU 40. The signal corrected in chromatic aberration is sent to image processing circuit 44. Image processing circuit 44 applies a predetermined image process such as MTF Modulation Transfer Function) correction and masking correction on the image signal. The processed image signal is output to an external computer, printer, or the like connected to the image reading apparatus via an interface unit 46.

Line RAM 36, an edge determination circuit 38, and CPU 40 determine the chromatic aberration correction coefficient used by chromatic aberration correction circuit 42. This will be described in detail afterwards.

Figure 3:
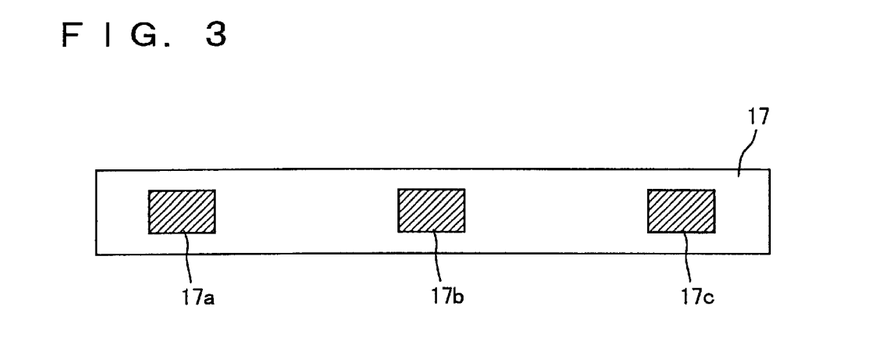
FIG. 3 is a plan view of a chromatic aberration correction chart of the image reading apparatus.

Referring to FIG. 3, chromatic aberration correction chart 17 mounted on platen 3 has a length identical to the length in the main scanning direction of the region where a document is to be placed on platen 3. Three black solid patches 17a–17c are drawn on the white plate. Each of black solid patches 17a–17c is a black rectangular pattern. Black solid patch 17b is drawn at the center of chromatic aberration correction chart 17. Black solid patches 17a and 17c are drawn in the proximity of respective ends of chromatic aberration correction chart 17. When light from lamp 5 is directed onto chromatic aberration correction chart 17, almost all the light is reflected at the white color area whereas almost no light is reflected from the area of black solid patches 17a–17c. In other words, the white color portion has a high reflectance whereas the black solid patch portion has a low reflectance.

In the present embodiment, a chromatic aberration correction chart having a black solid patch drawn on a white color plate is used. The pattern is not limited thereto as long as the reflectance differs. For example, a solid patch of gray in color can be drawn on a white color plate.

Figure 4:
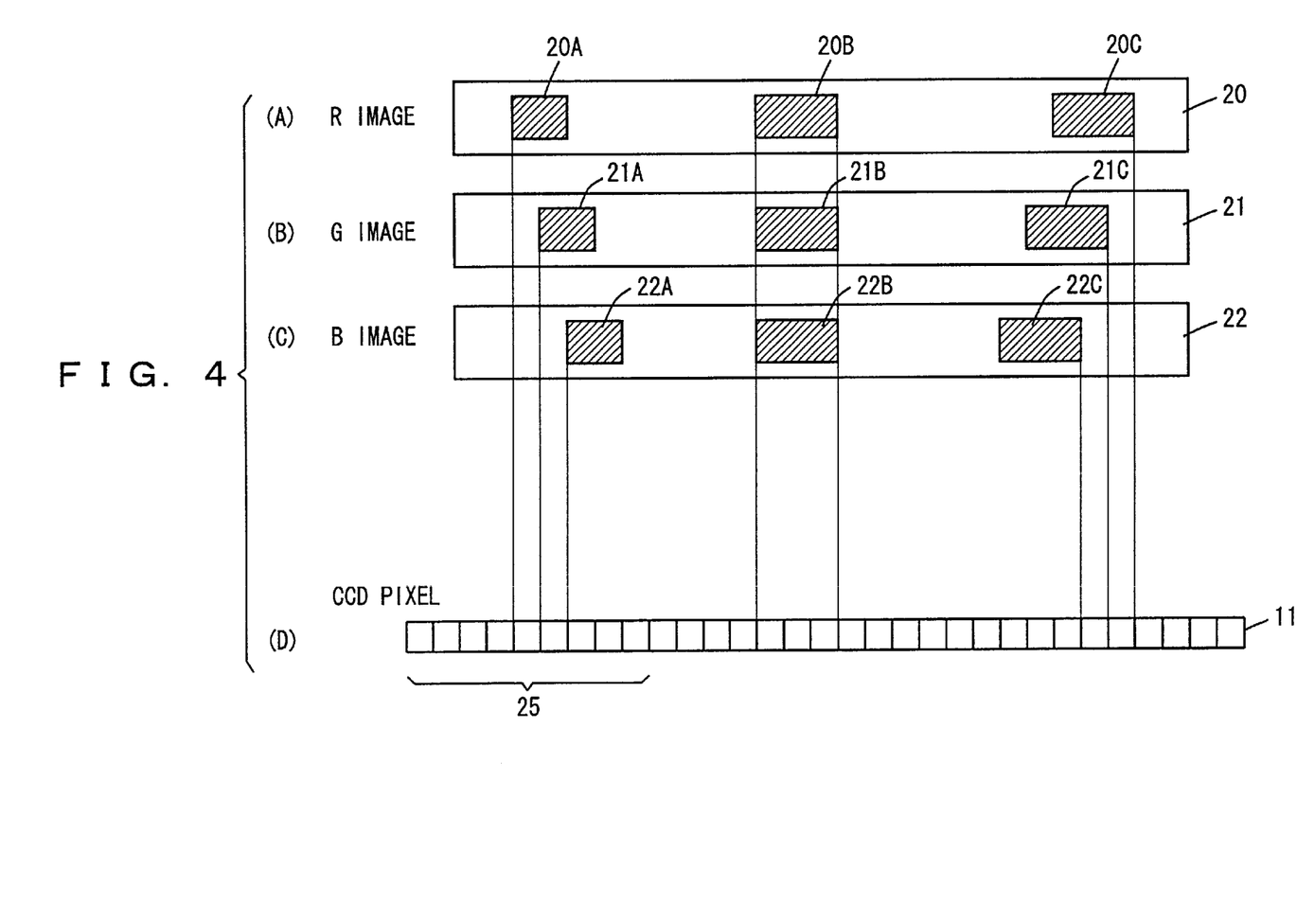
FIG. 4 is a diagram to describe the relationship between the R, G, and B image outputs and the CCD pixel position of a CCD linear sensor when the chromatic aberration correction chart is scanned.

Referring to FIG. 4, (A) represents an R image obtained from the R output of CCD linear sensor 11, (B) represents a G image obtained from the G output of CCD linear sensor 11, and (C) represents a B image obtained from the B output of CCD linear sensor 11. The index of refraction of the light passing through lens 9 differs since each wavelength of the R, G, and B light differs. Therefore, the R image, the G image, and the B image obtained from the output of CCD linear sensor 11 differ. Region 20B of the R image, region 21B of the G image and region 22B of the B image respectively correspond to black solid patch 17b located at the center of chromatic aberration correction chart 17. Regions 20B, 21B and 22B are read out as located at the same position in each of the R, G, and B images. Region 20A of the R image, region 21A of the G image and region 22A of the B image respectively correspond to black solid patch 17a of chromatic aberration correction chart 17. It is to be noted that regions 20A, 21A and 22A are displaced in the main scanning direction. Similarly, region 20C of the R image, region 21C of the G image and region 22C of the B image respectively correspond to black solid patch 17c of chromatic aberration correction chart 17. Regions 20C, 21C and 22C are displaced in the main scanning direction.

This displacement of the R, G, and B images becomes greater as a function of distance from the center of CCD linear sensor 11. This displacement is the chromatic aberration caused by the property of lens 9.

Figure 5:
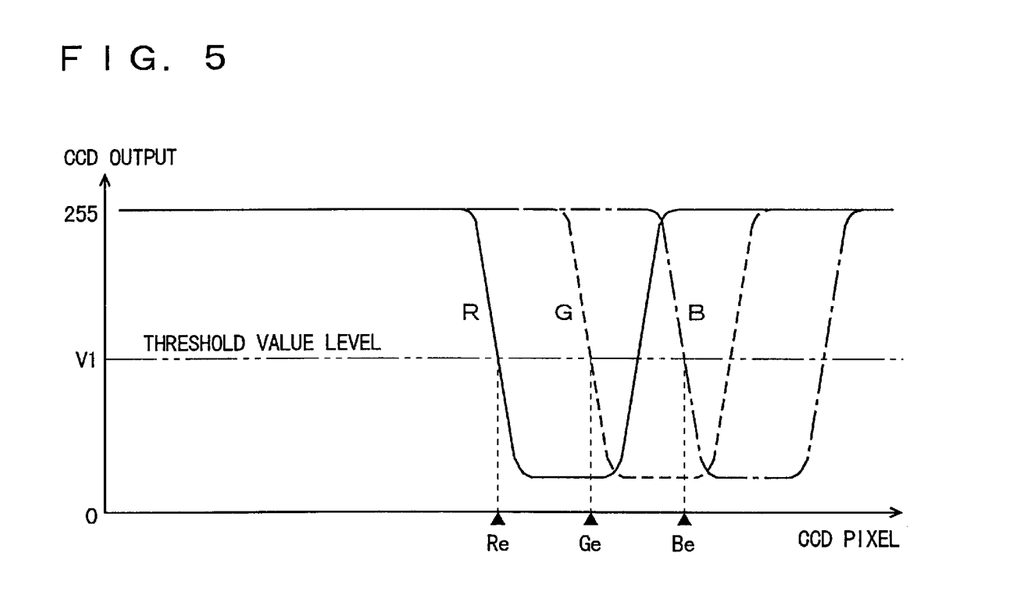
FIG. 5 shows the output of the CCD pixel in a pixel range 25 of the pixels of the CCD linear sensor shown in FIG. 4 (D).

In the graph of FIG. 5, the CCD output is plotted along the vertical axis and the CCD pixels are plotted along the horizontal axis. The R output is represented by a solid line. The G output is represented by a dotted line. The B output is represented by a chain dotted line. When the CCD output value of all the R, G, and B outputs is 255, "white" is represented. When all the CCD output value of the R, G, and B outputs is 0, "black" is represented. It is appreciated from FIG. 5 that each of the R, G, and B outputs has the CCD output value vary from the maximum value to the minimum value. For example, there are several pixels during the transition of the R output from the maximum value to the minimum value. The edge portion of black solid patch 17a of chromatic aberration correction chart 17 should be present in any of these pixels. The same applies for the G output and the B output. It is therefore necessary to determine which of the pixels in this range corresponds to the edge portion of black solid patch 17a of chromatic aberration correction chart 17. The process of this determination will be described hereinafter.

In FIG. 5, a threshold value V1 indicated by the chain line with two dots is set. Determination is made that the pixel with each of the R, G, and B outputs attaining V1 is the edge pixel. In FIG. 5, the edge pixel of the R output is Re. The edge pixel of the G output is Ge. The edge pixel of the B output is Be.

It is appreciated that the position of the edge pixels Re, Ge and Be of the respective R, G, and B outputs differ. This difference in the pixel position corresponds to the amount of chromatic aberration of the lens. There is no deviation in the pixel position at the center area of CCD linear sensor 11, i.e. in the proximity of the area corresponding to the optical axis of lens 9, since there is no chromatic aberration. However, deviation in the pixel position becomes noticeable in proportion to the distance from the center area. It is therefore preferable to provide the black solid patch in the proximity of the end area of chromatic aberration correction chart 17.

The process of obtaining edge pixels Re, Ge and Be is carried out by edge determination circuit 38 shown in FIG. 2. Edge determination circuit 38 receives threshold value V1 from CPU 40 to carry out the abovedescribed process in order to obtain the edge pixel. The obtained edge pixel is provided to chromatic aberration correction circuit 42 via CPU 40.

Figure 6:
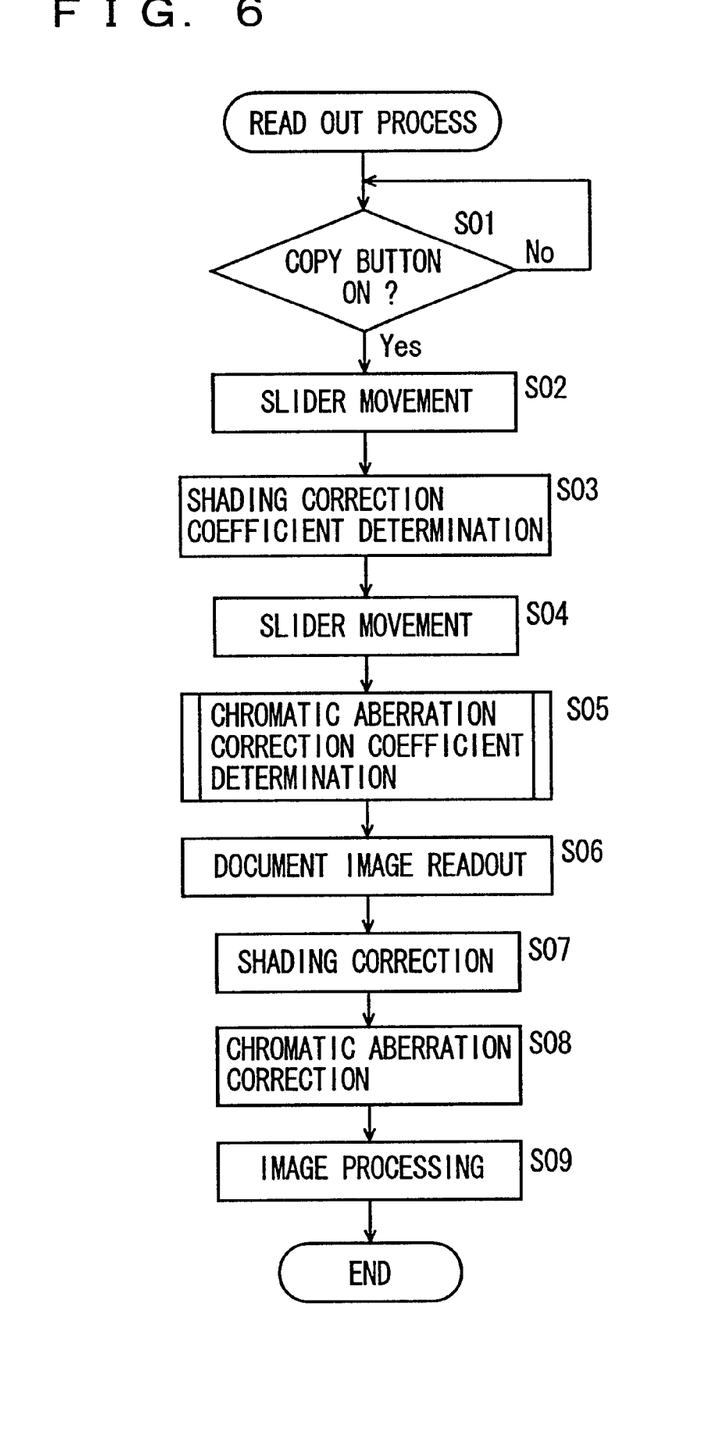
FIG. 6 is a flow chart showing a reading process of the image reading apparatus.

The read out process carried out by the image reading apparatus of the present embodiment will be described hereinafter with reference to the flow chart of FIG. 6. When a copy button (not shown) provided at the top surface of the image reading apparatus is depressed (step S01), slider 8a moves below shading correction plate 19 (step S02). Light from lamp 5 is directed onto shading correction plate 19, whereby the reflected light enters CCD linear sensor 11. The correction coefficient used in the aforementioned shading correction at shading circuit 34 is determined (step S03).

Then, slider 8a moves to the area under chromatic aberration correction chart 17 (step S04). Light from lamp 5 is directed onto chromatic aberration correction chart 17. The correction coefficient used in chromatic aberration correction by chromatic aberration correction A circuit 42 is determined (step S05). This will be described afterwards.

Then, slider 8a moves under the document in the sub-scanning direction, whereby the image of the document is read out (step S06). The read image data is subjected to shading correction at shading circuit 34 (step S07), subjected to chromatic aberration correction at chromatic aberration correction circuit 42 (step S08), and subjected to predetermined image processing at image processing circuit 44 (step S09).

Figure 7:
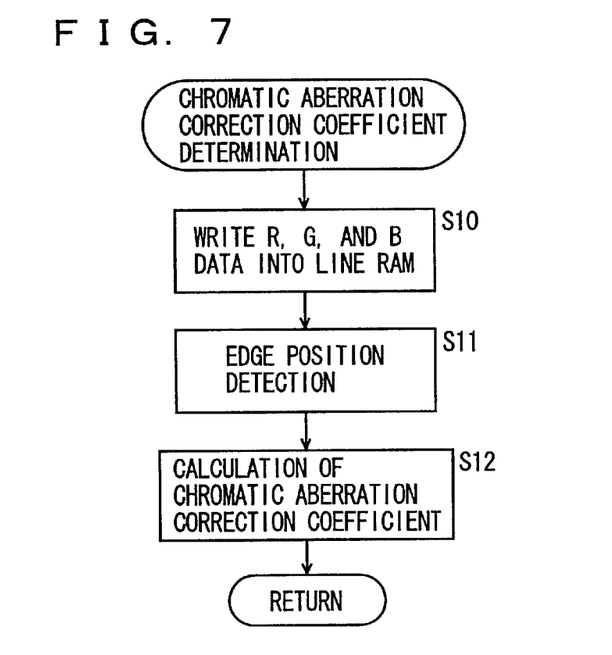
FIG. 7 is a flow chart showing a process of determining the chromatic aberration correction coefficient of the image reading apparatus.

Determination of the chromatic aberration correction coefficient used by chromatic aberration correction circuit 42 (step S05 of FIG. 6) will be described hereinafter with reference to the flow chart of FIG. 7. Slider 8a moves to the area under chromatic aberration correction chart 17. CCD linear sensor 11 reads out one line of chromatic aberration correction chart 17. When one line is read out, R, G, and B outputs are written into line RAM 36 as the image signal (step S10). The edge pixel (Re, Ge, Be) for each output of R, G, and B described with reference to FIG. 5 is obtained by edge determination circuit 38. The position of that edge pixel on CCD linear sensor 11 is detected as the edge position (step S11). Then, the chromatic aberration correction coefficient is calculated (step S12). The chromatic aberration correction coefficient corresponds to the distance $\Delta R$ between edge pixels Ge and Re, and distance $\Delta B$ between edge pixels Ge and Be, which are calculated by the following equations.

$\Delta R$=(address of edge pixel Ge)−(address of edge pixel Re)

$\Delta B$=(address of edge pixel Ge)−(address of edge pixel Be)

Figure 8:
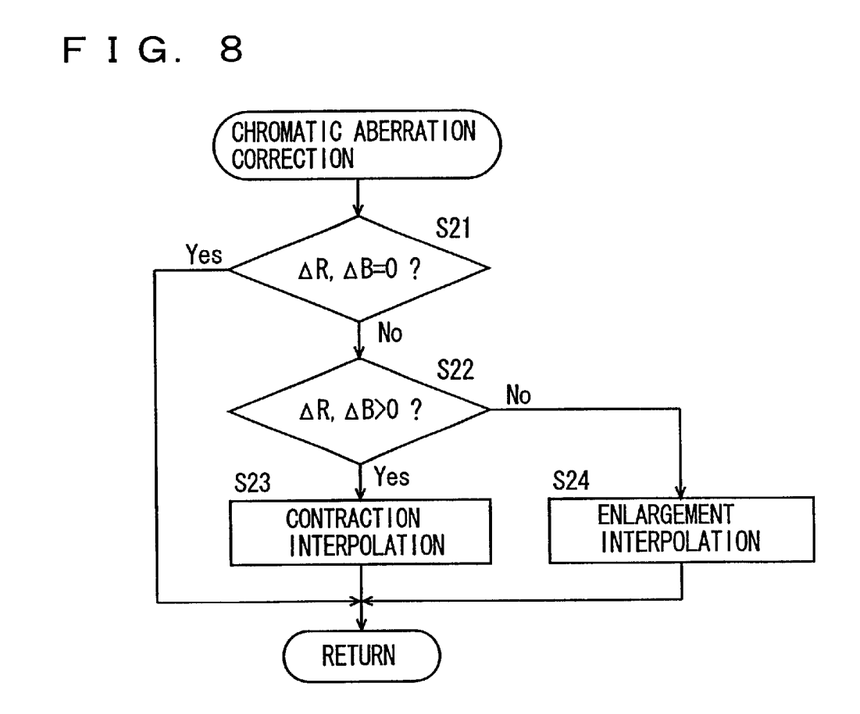
FIG. 8 is a flow chart showing a chromatic aberration correction process of the image reading apparatus.

The chromatic aberration correction process (step S08 of FIG. 6) carried out by chromatic aberration correction circuit 42 will be described with reference to the flow chart of FIG. 8. At step S21, determination is made whether each of chromatic aberration correction coefficients $\Delta R$ and $\Delta B$ is 0 or not. When chromatic aberration correction coefficients $\Delta R$ and $\Delta B$ are 0, the process ends without effecting chromatic aberration correction since chromatic aberration does not occur. When chromatic aberration correction coefficients $\Delta R$ and $\Delta B$ are not 0, correction of chromatic aberration is carried out since chromatic aberration has occurred. At step S22, determination is made whether chromatic aberration correction coefficients $\Delta R$ and $\Delta B$ are positive or negative. When the value is positive, contraction interpolation is carried out (step S23). When the value is negative, enlargement interpolation is carried out (step S24).

Contraction interpolation and enlargement interpolation will be described here. Correction of chromatic aberration includes contraction interpolation and enlargement interpolation. When the distance between the edge pixel of the R or B output and the center pixel is greater than the distance between the edge pixel of the G output and the center pixel, contraction interpolation is carried out. When the former distance is smaller than the latter distance, enlargement interpolation is carried out. This contraction interpolation and enlargement interpolation can be carried out using the general method such as linear interpolation.

Figure 9:
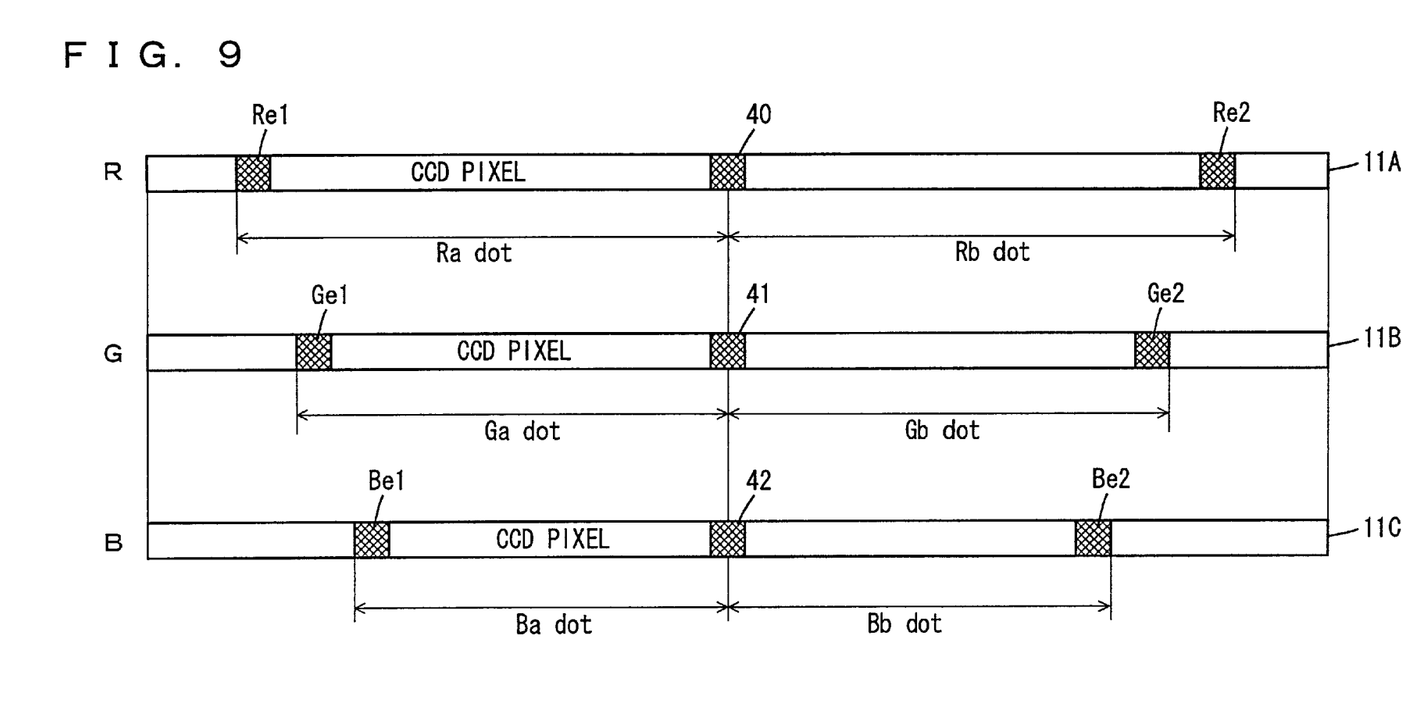
FIG. 9 is a diagram to describe enlargement interpolation and contraction interpolation in the chromatic aberration correction process.

The contraction interpolation and enlargement interpolation will be described in further detail. Referring to FIG. 9, the distance between center pixel 40 of the R output and edge pixel $Re_1$ is Ra [dot]. The distance between center pixel 40 and edge pixel $Re_2$ is Rb [dot]. The distance between center pixel 41 of the G output and edge pixel $Ge_2$ is Ga [dot]. The distance between center pixel 41 and edge pixel $Ge_2$ is Gb [dot]. The distance between the center pixel 42 of the B output and edge pixel $Be_2$ is Ba [dot]. The distance between center pixel 42 and edge pixel $Be_2$ is Bb [dot].

When chromatic aberration occurs, the distance Ga between edge output $Ge_1$ of the G output and center pixel 41 is compared with distance Ra between edge pixel $Re_1$ of the R output and center pixel 40 for the pixels to the left of center pixels 40, 41 and 42 in the drawing. Since Ga<Ra, contraction interpolation is carried out to contract Ra with the ratio of Ra'=Ra/Ga. In contrast, distance Ga between edge pixel $Ge_1$ of the G output and center pixel 41 is compared with distance Ba between edge pixel $Be_1$ of the B output and center pixel 42. Since Ga>Ba, enlargement interpolation is carried out to enlarge Ba with the ratio of Ba'=Ga/Ba.

As to the pixels to the right of center pixels 40, 41 and 42 in the drawing, Gb<Rb similar to the pixels at the left side. Therefore, Rb is contracted with the ratio of Rb'=Rb/Gb. Also, since Gb>Bb, Bb is enlarged with the ratio of Bb'=Gb/Bb.

As described above, the image reading apparatus of the present embodiment scans the chromatic aberration correction chart absent of chromatic aberration to obtain chromatic aberration caused by the lens through edge determination circuit 38 according to the R, G, and B outputs of CCD linear sensor 11. Since this chromatic aberration is corrected by chromatic aberration correction circuit 42, the chromatic aberration caused by the lens can be corrected reliably. Furthermore the color of the document image can be read out accurately since correction of only the chromatic aberration caused by the lens is effected. Furthermore, identification can be made that the chromatic aberration in the read out image, if any, is caused by the document per se.

Although the R, G, and B outputs are obtained using one CCD linear sensor through the RGB filters in the present embodiment, other CCD linear sensors can be used as long as the light reflected from the document can be received as light of a different wavelength. For example, the light reflected from the documents can be separated into the light of R, G, and B using a spectral prism to receive the divided light with three CCD linear sensors.

Although chromatic aberration is corrected using a chromatic aberration correction chart having three black solid patches as shown in FIG. 3 in the present embodiment, a chromatic aberration correction chart having one solid patch located remote from the center of the optical axis can be used instead. In this case, the pixel located at the position symmetric to the detected edge pixel about the center pixel of the CCD linear sensor is obtained, and chromatic aberration is corrected using the distance between the edge pixel and the center pixel and also the distance between the symmetric pixel and the center pixel. Accordingly, chromatic aberration can be corrected with respect to pixels located at both sides of the center pixel. It is to be noted that positioning of the lens and the CCD linear sensor must be effected precisely so that the center pixel of the CCD linear sensor is located on the optical axis of the lens.

A modification of the process to obtain the edge pixel carried out by edge determination circuit 38 will be described hereinafter. Referring to the graph of FIG. 10, the CCD outputs are plotted along the vertical axis and the CCD pixels are plotted along the horizontal axis. The R output of CCD linear sensor 11 is represented by the solid line. The G output is represented by the dotted line. The B output is represented by the chain dotted line. In this modification, two threshold values of V1 and V2 are used. Considering the R output, for example, the pixel corresponding to the R output of threshold value V1 is Re1 and the pixel corresponding to the R output of threshold value V2 is Re2 during the transition of the R output from the maximum value to the minimum value. The edge pixel of the R output is defined as the pixel located intermediate pixels Re1 and Re2. The same applies for the respective edge pixels for the G and B outputs.

Figure 10:
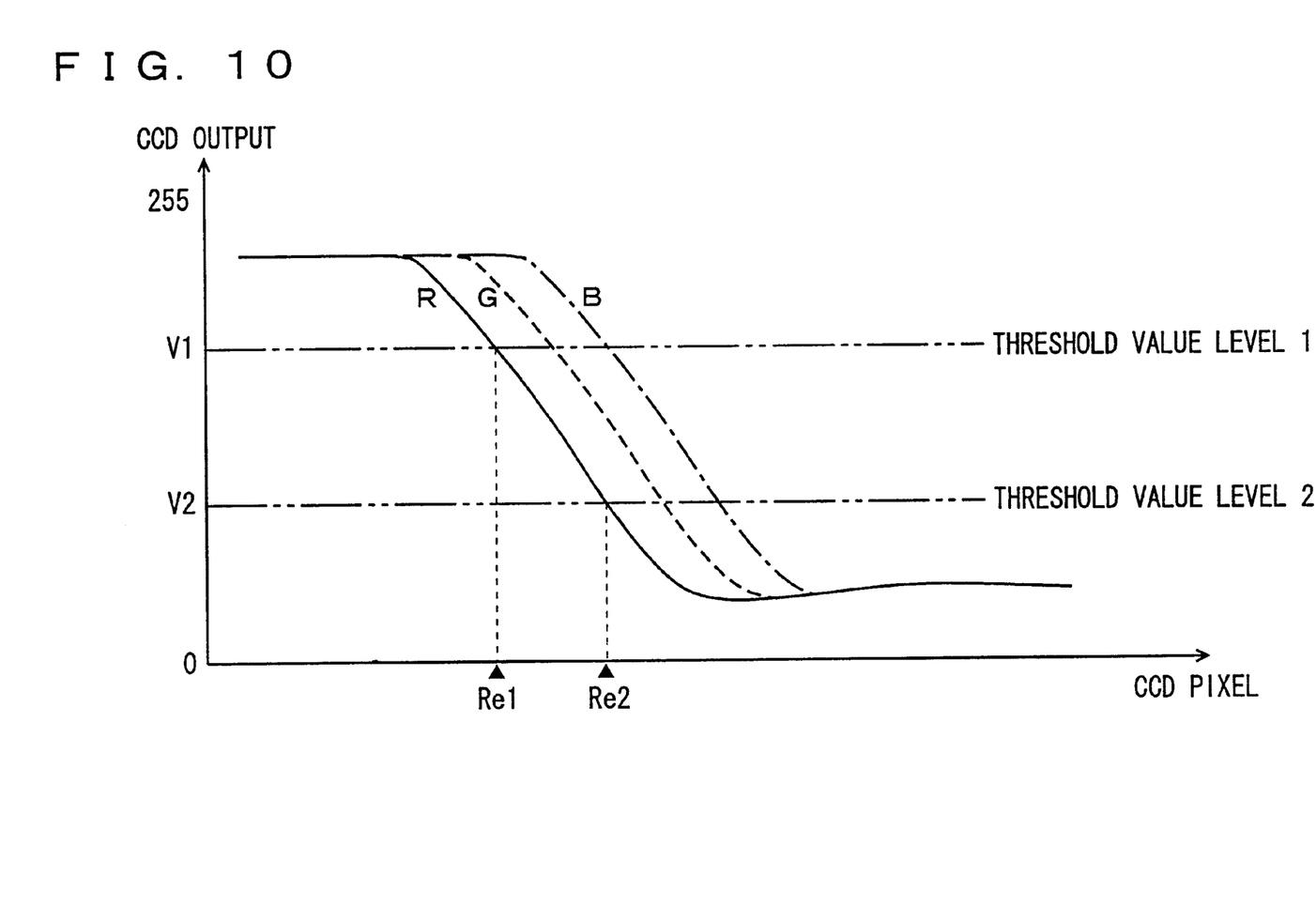
FIG. 10 is a diagram to describe a modification of an edge position detection process carried out in the chromatic aberration correction coefficient determining process of the image reading apparatus.

The provision of two threshold values allows detection of the edge pixel to be carried out more precisely than the case where only one threshold value is used.

Second Embodiment

The image reading apparatus according to the second embodiment of the present invention is directed to improvement of the chromatic aberration correction chart of the image reading apparatus of the first embodiment. The remaining elements are similar to those of the first embodiment. Therefore, description thereof will not be repeated.

Figure 11:
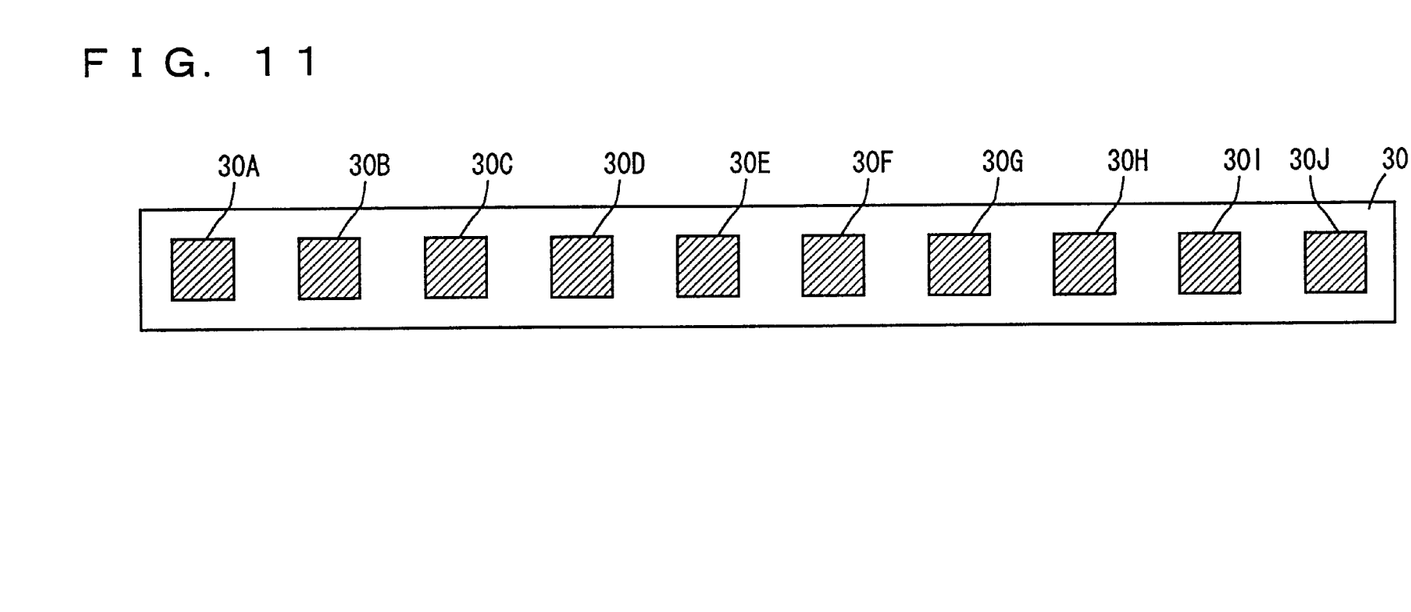
FIG. 11 is a plan view of a chromatic aberration correction chart according to a second embodiment of the present invention.

Referring to FIG. 11, a chromatic aberration correction chart 30 has a plurality of black solid patches 30A–30J arranged at equal intervals in the main scanning direction on a white plate.

Figure 12:
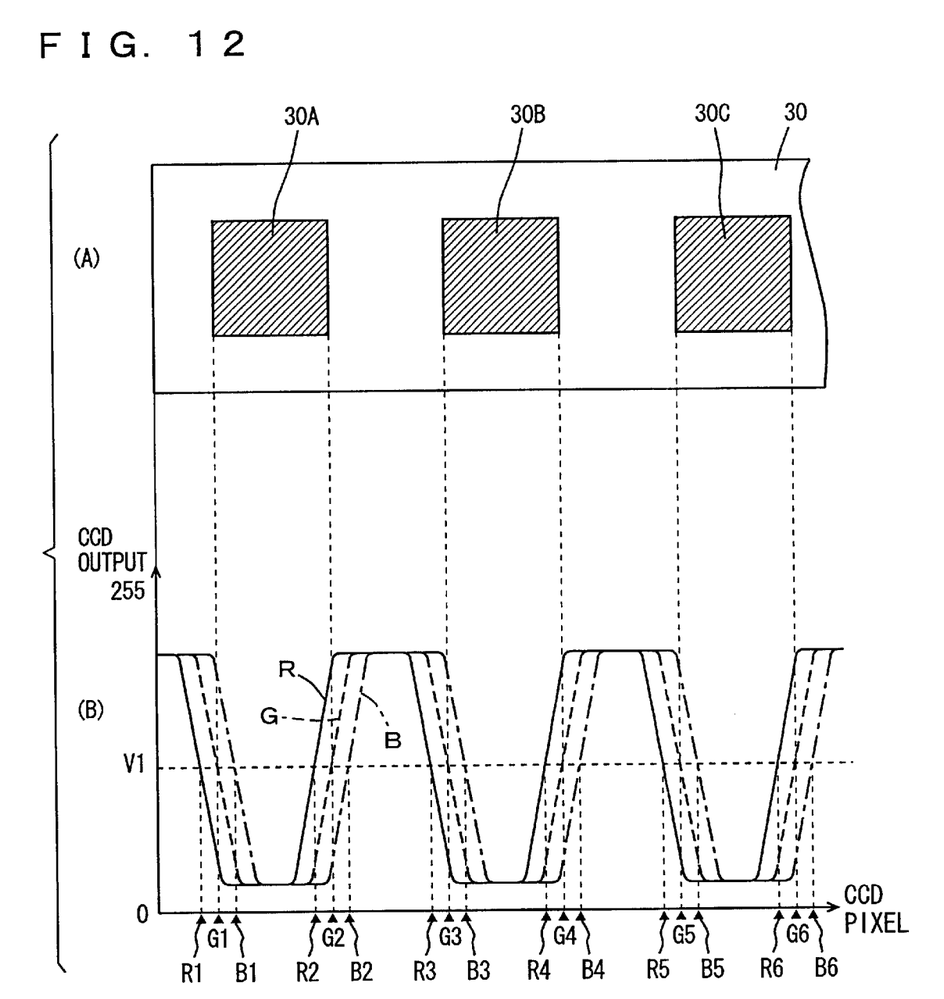
FIG. 12 is a diagram to describe the relationship between a part of the chromatic aberration correction chart and the CCD linear sensor output according to the second embodiment.

In FIG. 12, (A) shows a portion of the chromatic aberration correction chart of FIG. 11, and (B) shows the R, G, and B outputs from CCD linear sensor 11 when the chromatic aberration correction chart of FIG. 12 (A) is scanned. In FIG. 12 (B), the CCD outputs are plotted along the vertical axis and the CCD pixels are plotted along the horizontal axis. The R output, the G output, and the B output are represented by the solid line, the dotted line, and the chain dotted line, respectively. Similar to the process of detecting an edge pixel described in the first embodiment, the pixel corresponding to respective R, G, and B outputs of threshold value V1 is detected as the edge pixel. As to the left side edge of black solid patch 30A in FIG. 12 (A), it is appreciated that the R output, the G output, and the B output in FIG. 12 (B) correspond to the edge pixels of R1, G1 and B1, respectively. As to the light side edge of black solid patch 30A in FIG. 12 (A), the edge pixels of the R output, the G output, and the B output in FIG. 12 (B) are R2, G2, and B2, respectively. Similarly, the edge pixels of black solid patches 30B and 30C shown in FIG. 12 (A) are detected as shown in FIG. 12 (B).

A plurality of edge pixel can be detected over the entire CCD linear sensor 11 by using the chromatic aberration correction chart of FIG. 11. Therefore, the chromatic aberration correction process can be carried out more accurately by chromatic aberration correction circuit 42. For example, referring to FIG. 12 (B), there is the case where the chromatic aberration obtained from edge pixels R1, G1 and B1 differs from the chromatic aberration obtained from edge pixels R2, G2 and B2. In such a case where the chromatic aberration differs greatly due to the distance from the center of CCD linear sensor 11, edge pixels are to be detected over the entire CCD linear sensor 11 to set a chromatic aberration correction coefficient for respective edge pixels. Accordingly, the chromatic aberration correction process can be carried out precisely over the entire main scanning direction. Therefore, the color of the image of the document can be read out accurately.

In the image read out apparatus of the present embodiment, the correction coefficient used in the chromatic aberration correction process is determined every time the start button is depressed, i.e. the chromatic aberration correction chart is scanned every time prior to reading out one document to determine the correction coefficient. However, determination of the correction coefficient can be performed only once at the time of powering on the image reading apparatus. Alternatively, the correction coefficient can be determined at the time of the adjustment stage prior to shipment of the image reading apparatus, or at the time of installing or adjusting the image reading apparatus.

Although a CCD linear sensor of one dimension is used in the present embodiment, a photoelectric conversion unit having photoelectric conversion elements arranged in a two dimensional manner can be used instead. In this case, chromatic aberration in the subscanning direction can be corrected by arranging the black solid patch of the chromatic aberration correction chart in the subscanning direction as well as in the main scanning direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   a chromatic aberration correction chart including a high reflectance portion and a low reflectance portion lower in reflectance than said high reflectance portion,
   a photoelectric conversion unit which receives light reflected from said chromatic aberration correction chart, and
   a correction processor which corrects chromatic aberration of image data according to a light receiving position in said photoelectric conversion unit receiving light of a first wavelength included in the reflected light from said chromatic aberration correction chart and a light receiving position in said photoelectric conversion unit receiving light of a second wavelength included in the reflected light from said chromatic aberration correction chart.

2. The image reading apparatus according to claim 1, further comprising a light source emitting light to said chromatic aberration correction chart.

3. The image reading apparatus according to claim 2, further comprising a shading correction plate to correct variation in distributed light of said light source.

4. The image reading apparatus according to claim 1, wherein said chromatic aberration correction chart has said high reflectance portion and said low reflectance portion arranged alternately in an arrangement direction of light receiving elements of said photoelectric conversion unit.

5. The image reading apparatus according to claim 1, wherein said correction processing unit determines a light receiving position by comparing an output of said photoelectric conversion unit with a predetermined reference value.

6. The image reading apparatus according to claim 1, wherein said photoelectric conversion unit includes a filter separating respective light of said first wavelength and said second wavelength.

7. The image reading apparatus according to claim 1, wherein said chromatic aberration correction chart has a distinct boundary between said high reflectance portion and said low reflectance portion.

8. The image reading apparatus according to claim 7, wherein said correction processing unit detects light receiving positions of the light of said first wavelength and said second wavelength included in light reflected from said boundary.

9. A chromatic aberration correction method of an image reading apparatus, comprising the steps of:
   receiving light reflected from a chromatic aberration correction chart including a high reflectance portion and a low reflectance portion lower in reflectance than said high reflectance portion,
   detecting a first light receiving position in a photoelectric conversion unit receiving light of a first wavelength included in light reflected from said high reflectance portion and a second light receiving position in said photoelectric conversion unit receiving light of a second wavelength included in light reflected from said high reflectance portion, and correcting chromatic aberration of image data according to said first and second light receiving positions.

10. The chromatic aberration correction method of an image reading apparatus according to claim 9, wherein said detecting step determines a light receiving position by comparing an output of said photoelectric conversion unit with a predetermined reference value.

11. A reading apparatus comprising:

a light source, a correction chart including portions formed in different density, an optical system which focuses light from said light source reflected at said correction chart, a light receiving unit which receives light focused by said optical system, separated into light of predetermined wavelengths, and a processor which corrects chromatic aberration caused by said optical system based on a difference between data of respective separated lights obtained by said light receiving unit.

12. The reading apparatus according to claim 11, further comprising a shading correction plate to correct variation in distributed light of said light source.

13. The reading apparatus according to claim 11, wherein said correction chart has a high density portion and a low density portion arranged alternately in an arrangement direction of light receiving elements of said light receiving unit.

14. The reading apparatus according to claim 11, wherein said processor determines a light receiving position by comparing an output of said light receiving unit with a predetermined reference value.

15. The reading apparatus according to claim 11, wherein said correction chart has a distinct boundary between the high density portion and the low density portion.

16. The reading apparatus according to claim 15, wherein said processor detects light receiving positions of light of a first wavelength and a second wavelength included in light reflected from said boundary.

* * * * *